July 18, 1950      G. R. AREL      2,515,167
UNIVERSAL TIRE SUPPORTING CARRIER
Filed Dec. 26, 1946
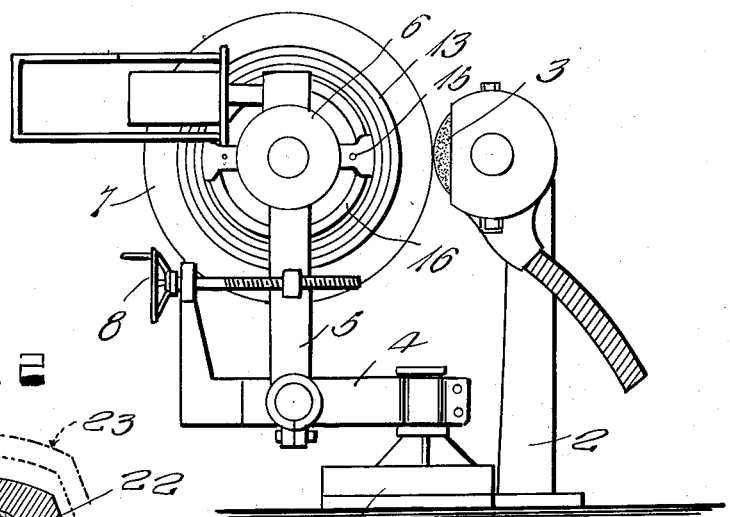
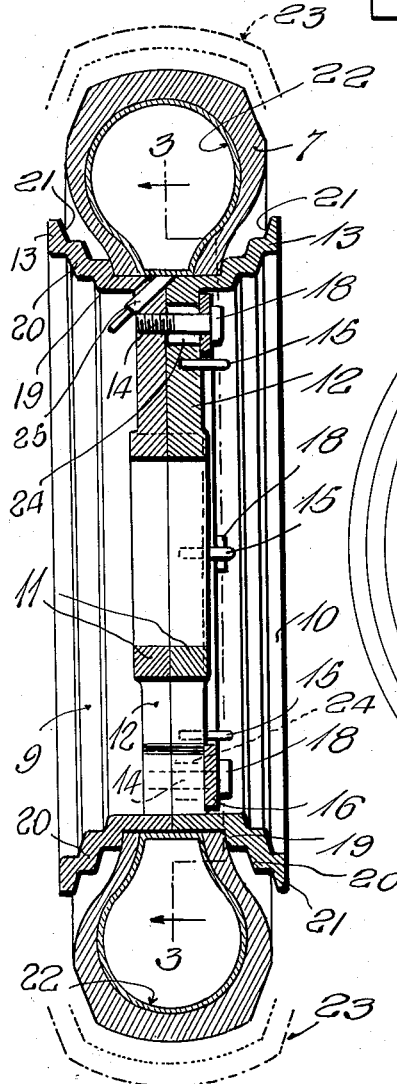
INVENTOR.
GLENN RUTHVEN AREL
BY Frank C. Maley
AGENT Patented July 18, 1950

2,515,167

UNITED STATES PATENT OFFICE 2,515,167

UNIVERSAL TIRE SUPPORTING CARRIER

Glenn Ruthven Arel, Tulsa, Okla.

Application December 26, 1946, Serial No. 718,526

4 Claims. (Cl. 51—237)

The present invention relates to tire buffing machines and more particularly to a universal tire supporting carrier or wheel for supporting and retaining the tire in proper cooperative relationship with the rotary buffing element of the machine whereby the tire may be prepared for vulcanizing, recapping, retreading or otherwise repairing.

An object of the invention is to provide a tire carrier or wheel of the character aforesaid having a demountable rim whereby a tire may be easily and conveniently mounted upon or removed from the carrier therefor with a minimum of physical effort on the part of the operator thereby facilitating the presentation and removal of the tire to the buffing element of the machine.

Another equally important object of the invention is to provide a tire support or carrier which without any additional or separable fastening elements or interchangeable parts will support and retain individual tires of various sizes.

A further object of the invention is to provide a device which is simple in construction and exceedingly effective for the purpose for which it is intended, yet comparatively inexpensive in the cost of manufacture, thereby rendering the same commercially desirable.

Other objects of the invention will be in part obvious and in part pointed out hereinafter as the description continues.

In the accompanying drawings:

Fig. 1 illustrates in side elevation a conventional tire buffing machine having the tire carrier or work-holder embodying the invention applied thereto.

Fig. 2 is a vertical transverse sectional view of the tire carrier with a standard tire mounted thereupon when supported and maintained for buffing operations, and Fig. 3 is a sectional view taken on the line 3—3 of Fig. 2 in the direction of the arrow points when a tire is removed.

Now having more particular reference to the drawings wherein I have illustrated a conventional buffing machine having my improved tire carrier or wheel applied thereto, with the machine including a base 1 having a pedestal 2 carrying a motor driven buffing wheel 3. A swinging arm 4 is also supported upon the base 1 and has pivotally connected thereto a lever 5 which latter has journalled within its upper free end a carrier 6. A pneumatic tire 7 may be moved to and from the buffing wheel 3 by manually rotating the wheel 8 whereby the outer periphery of the tire may be rasped and buffed as is necessary in removing the old rubber when preparing the tire for retreading.

Usually the tire carriers for such buffing machines are either interchangeable or adjustable in order to support and retain tires of different size all of which are not only expensive in their cost to construct, but greatly retard the mounting of the tire for buffing or the removal of the same, and according to the present invention the tire carrier will hold and retain either of three different size tires without adjustments or the interchanging of parts therefor and yet the tire so mounted may be locked into position thereupon.

This improved tire carrier consists of a sectional wheel in which the main section 9 has detachably and removably connected therewith a companion section 10. Each section consists of a hub 11, spokes 12, and outer rim portion 13; the sections are detachably connected together by means of the stud bolts 14. The hub of the wheel is mounted for rotation upon a shaft carried by the lever 5 of the buffing machine and a tire 7 is retained in position upon the wheel by means of the rim portions 13. The adjacent faces of the sections 9 and 10 are preferably smooth so as to snugly fit to one another; projecting from the outer face of the spokes 12 of the section 10 are the pins 15 which latter form a guide for the locking ring 16. This locking ring has four key slots formed therein and each slot has a reduced section for receiving the shank portions of the bolts 14 and an enlarged section 17 through which may pass the round heads 18 of the bolts. For the purpose of mounting or dismounting the tire casing which is to be treated, sections 9 and 10 are separated from each other by the removal of section 10, thus permitting the tire casing and its inner tube to be positioned or removed, section 9 remaining in position and carrying the bolts 14, the latter having threaded engagement with section 9 to permit tightening and loosening of the bolts during the mounting and demounting operations; with the sections separated, and the bolts slightly loosened, the bolt heads will be spaced from the face of section 9. After the tire casing and its inner tube have been placed in position relative to section 9, section 10 is placed in position on the bolts by passing openings in the spokes of the section over the heads of the bolts, thus placing the section in facial contact with section 9 with both sections mounted on the supporting shaft, section 10 being properly positioned in its mating relation with section 9 to permit proper location of the inner tube inflating fixture. The locking ring is then positioned over section 10 by passing the sections 17 of its key slots over the bolt heads, after which the locking ring is moved arcuately to place the reduced width of the key slots beneath the bolt head, after which the bolts are tightened, thus producing a rigid support for the tire casing and its inner tube preparatory to the buffing activities. After the completion of the buffing, the parts are demounted by reversing the procedure described. Each bolt preferably has a socket within the head 18 thereof whereby a standard socket wrench may be connected thereto for adjusting the heads of the bolts to the proper spaced position from the section 9 as would accommodate the spokes 12 of the section 10 and the locking ring 16 therebetween. The spokes 12 of the section 10 are provided with openings 24 therein each having a diameter slightly larger than that of a head 18 of the bolts whereby when connecting the sections 9 and 10 together or separating the same the bolts and their enlarged heads 18 may pass therethrough. The heads 18 of these bolts also can pass freely through the enlarged sections 17 of the slots within the locking ring in order that the latter may be removed from the wheel.

The outer peripheral surface of each rim portion 13 is of a stepped formation whereby the bead portions of the casings of pneumatic tires of either of three different sizes of tire casings may be seated therebetween. The most popular pneumatic tires come in three sizes, namely, 15", 16" and 17" size. The tire as herein shown represents that of the 15" size and its beaded ends therefore can be seated between the lower step 19 of the rims. A 16" size tire would fit within the next or intermediate steps 20 of the rims and the larger or 17" size tire can have the beads thereof accommodated between the outer steps 21 of the rims. When positioning a tire casing 7, with the sections 9 and 10 separated, the inner tube is in deflated condition, permitting the casing and tube to be readily positioned relative to section 9. After section 10 has been placed in position with the inner tube inflating fixture properly projected, the beads of the tire casing are properly positioned relative to the proper individual step of the rims 13, after which inflation of the inner tube practically anchors the tire casing to this fabricated support. When larger size tires are locked upon the wheel the outer periphery of the large size tire will assume the position as that shown in dotted lines in Fig. 2 and indicated by the reference numeral 23.

In operation with section 10 removed and with section 9 of my tire carrier or wheel remaining upon the buffing machine any one of three different size tires may be applied thereto or removed therefrom. When installing a tire to be buffed it is simply necessary to place the tire upon the rim 13 of the section 9 and permit the valve stem 25 of the inner tube 22 to project through an opening in the rim 13 until it assumes the position as shown in Fig. 2 of the drawings. The section 10 is then inserted over the fixed bolts 14 until the rim 13 of the section 10 receives a beaded portion of the tire or the tire is positioned between the proper stepped portions of the rims 13 as is best shown in Fig. 2. The locking ring 16 is then placed over the heads 18 of the bolts and by giving the ring a slight turn the reduced portions of the slots within the ring will receive the shank portions of the bolts for retaining the ring 16 between the heads 18 of the bolts and the spokes of the section 10 whereby the latter will be secured to the section 9 of the wheel. The inner tube 22 of the tire is then inflated whereupon the tire will be immovably retained upon the wheel and can be rotated therewith during the usual buffing operations. To remove the buffed tire from the carrier or wheel the inner tube 22 is first deflated and the locking ring together with the section 10 is then removed whereupon the tire and its inner tube can be removed from the section 9 of the wheel.

As will be understood, the present invention is designed to provide the buffing action upon the demounted tire structure—the tire casing with its inflatable inner tube—in contrast to the practice of providing the buffing action upon the tire mounted on its usual wheel support—the latter practice placing the entire wheel unit on the buffing mechanism support. The difference in this respect provides certain advantages in favor of the type disclosed herein. For instance, the buffing mechanism may be materially simplified, since the supporting structure for the tire casing is the same with either of the different dimensioned tire casings in position, so that the median line of the tire is always at the same point, although the actual width of the tire face differs; hence there is no requirement of accurate adjustments of the mechanism to locate the position of the median line, since the particular arrangement of the stepped rims automatically compensates for this difference in the width of the tires of different sizes. In other words, the positioned tire is always properly symmetrical to the median line of the support with the latter exemplified by the plane of the mating faces of sections 9 and 10; the result being that when such plane is properly established, all buffing operations are relative to such plane.

This advantage is obtainable through the fact that the support is formed of the two sections 9 and 10 which can be separated for the mounting of the casing and its inner tube, and then assembled into a rigid formation to which the casing is anchored by the inflation of its inner tube. Since the sections are separable, each rim portion can be formed with its share of the steps which combinedly produce the respective seats for the different-sized tires. The steps are positioned so that the median line of the tire casing being positioned is always located on such plane, the lateral distance from such plane of the different steps being so arranged that when the sections are combined the seat produced is in accord with the rim zone of the wheel on which the tire is normally used. In other words, the beadseats for the tire casings are symmetrically disposed relative to such median plane and to the diameter of the sections. Since the sections are separable, thus separating the opposite step portions, any desired number of steps may be provided—the present disclosure illustrating three of such steps—thus making it possible to position the smaller sized tire casings, even though the rim portion of each section has dimensions such as would not permit the smaller casing to be passed over the rim.

I claim:

1. A tire holder adapted to be mounted on the work holding arbor of a buffing machine for supporting the tire during buffing operation, said tire holder comprising a pair of complemental sections one of the sides of each of which is of mating planar type to permit assembly of the sections with the planar sides in facial contact, said sections having alined axial openings to permit mounting on the work holding arbor, each section having a rim portion of step form in cross-section with the steps increasing in diameter in direction away from such planar sides, companion steps of the sections being adapted to form seats for tire positioning, the several steps of a section permitting the mounting of work individual to a step seat with the respective seats dimensioned for mounting work tire casings and inner tubes differing in dimensions, and demountable means for securing the sections in assembled relation comprising an annular locking ring adapted to overlie the outer face of one of the sections when the latter are assembled in work-supporting position with the ring located in the vicinity of the rim portion, the other of said sections carrying a plurality of elements cooperative with the ring to provide the anchorage by rotative movements of the ring.

2. A tire holder as in claim 1 characterized in that the elements are in the form of headed bolts threadedly connected to such other section, the first section and the ring having openings for the passage of the bolt heads with the ring openings in the form of key slots.

3. A tire holder as in claim 2 characterized in that at least one of the sections presents an opening for the passage of the inner tube inflating fixture to thereby permit tube inflation after the sections have been assembled with the tire casing located on its appropriate seat of the assembled sections.

4. A tire holder adapted to be mounted on the work holding arbor of a buffing machine for supporting the tire during buffing operation, said tire holder comprising a pair of complemental sections one of the sides of each of which is of mating planar type to permit assembly of the sections with the planar sides in facial contact, said sections having alined axial openings to permit mounting on the work holding arbor, each section having a rim portion of step form in cross-section with the steps increasing in diameter in direction away from such planar sides, companion steps of the sections being adapted to form at least three seats for tire positioning, the several steps of a section permitting the mounting of work individual to a step seat with the respective seats dimensioned for mounting work tire casings and inner tubes differing in dimensions, and demountable means for removably securing the sections in assembled relation.

GLENN RUTHVEN AREL.

REFERENCES CITED

The following references are of record in the file of this patent:

UNITED STATES PATENTS

| Number | Name | Date |
|---|---|---|
| 1,074,787 | Godley | Oct. 7, 1913 |
| 1,389,974 | Olim | Sept. 6, 1921 |
| 2,045,778 | Huntley et al. | June 30, 1936 |
| 2,187,557 | Gillespie | Jan. 16, 1940 |
| 2,272,962 | Tatter et al. | Feb. 10, 1942 |
| 2,294,047 | Pollock | Aug. 25, 1942 |